US010210010B1

(12) United States Patent
Ramachandran et al.

(10) Patent No.: US 10,210,010 B1
(45) Date of Patent: Feb. 19, 2019

(54) NETWORK RECONFIGURATION IN HYPERVISOR-AGNOSTIC DISASTER RECOVERY SCENARIOS

(71) Applicant: Nutanix, Inc., San Jose, CA (US)

(72) Inventors: Parthasarathy Ramachandran, Palo Alto, CA (US); Karthik Chandrasekaran, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 48 days.

(21) Appl. No.: 14/985,360

(22) Filed: Dec. 30, 2015

(51) Int. Cl.
G06F 9/455 (2018.01)
H04L 12/24 (2006.01)
G06F 11/14 (2006.01)

(52) U.S. Cl.
CPC ...... *G06F 9/45558* (2013.01); *G06F 11/1417* (2013.01); *G06F 11/1451* (2013.01); *H04L 41/0816* (2013.01); *G06F 2009/45575* (2013.01); *G06F 2009/45587* (2013.01); *G06F 2009/45595* (2013.01); *G06F 2201/805* (2013.01)

(58) Field of Classification Search
None
See application file for complete search history.

(56) References Cited

U.S. PATENT DOCUMENTS

| 8,418,176 | B1* | 4/2013 | Keagy | G06F 8/63 |
| | | | | 718/1 |
| 8,549,518 | B1 | 10/2013 | Aron et al. | |
| 8,601,473 | B1 | 12/2013 | Aron et al. | |
| 8,850,130 | B1 | 9/2014 | Aron et al. | |
| 8,997,097 | B1 | 3/2015 | Aron et al. | |
| 9,052,936 | B1 | 6/2015 | Aron et al. | |
| 9,256,374 | B1 | 2/2016 | Aron et al. | |
| 9,256,475 | B1 | 2/2016 | Aron et al. | |
| 9,354,912 | B1 | 5/2016 | Aron et al. | |
| 9,389,887 | B1 | 7/2016 | Aron et al. | |
| 9,575,784 | B1 | 2/2017 | Aron et al. | |
| 9,619,257 | B1 | 4/2017 | Aron et al. | |
| 2011/0184993 | A1* | 7/2011 | Chawla | G06F 9/45533 |
| | | | | 707/802 |
| 2012/0137098 | A1* | 5/2012 | Wang | G06F 3/0617 |
| | | | | 711/165 |
| 2012/0144229 | A1* | 6/2012 | Nadolski | G06F 11/1484 |
| | | | | 714/4.2 |

(Continued)

*Primary Examiner* — Sisley N Kim
(74) *Attorney, Agent, or Firm* — Vista IP Law Group, LLP

(57) ABSTRACT

Systems for bring-up of virtual machines in disaster recovery scenarios where the network configuration differs between the failed system and the recovery system. A method commences upon identifying a disaster recovery plan for restarting a set of virtual machines on a second system (e.g., a recovery system). A disaster event is detected, which event causes initiation of aspects of the disaster recovery plan, including restarting the set of virtual machines that were running on the first system. Other aspects of the disaster recovery plan include determining a set of network configuration directives pertaining to the second system, and providing access to the network configuration directives by any of the restarted virtual machines. During disaster recovery bring-up, at least some of the virtual machines that are restarted on the second system use the network configuration of the recovery system.

20 Claims, 14 Drawing Sheets

(56) References Cited

U.S. PATENT DOCUMENTS

| | | | |
|---|---|---|---|
| 2014/0040206 A1* | 2/2014 | Ramakrishnan | G06F 11/2097 707/640 |
| 2015/0341221 A1* | 11/2015 | Vatnikov | H04L 41/0893 718/1 |
| 2015/0378761 A1* | 12/2015 | Sevigny | G06F 9/45558 718/1 |
| 2015/0378766 A1* | 12/2015 | Beveridge | G06F 9/45558 718/1 |
| 2017/0060707 A1* | 3/2017 | Harper | G06F 11/2033 |

* cited by examiner

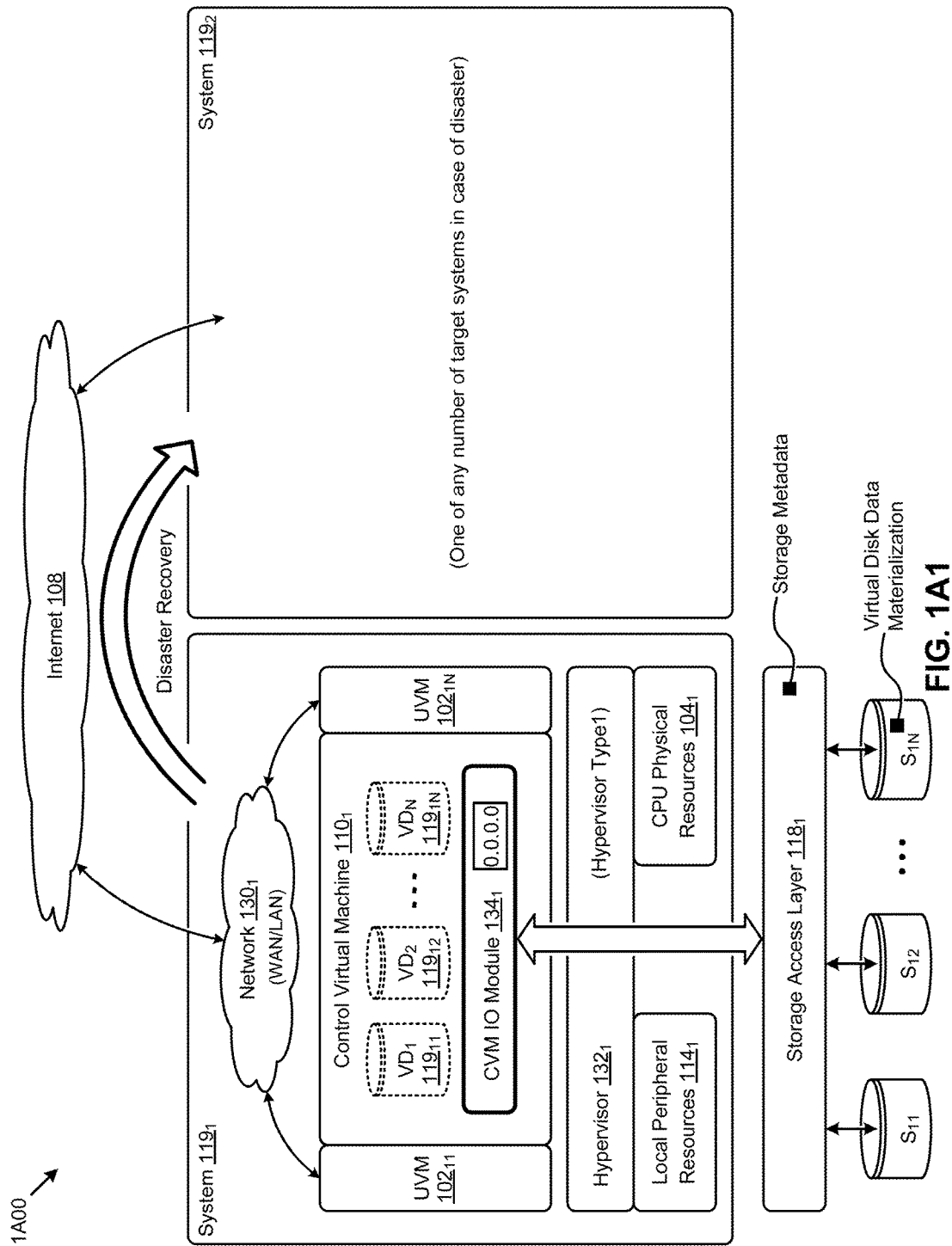
FIG. 1A1

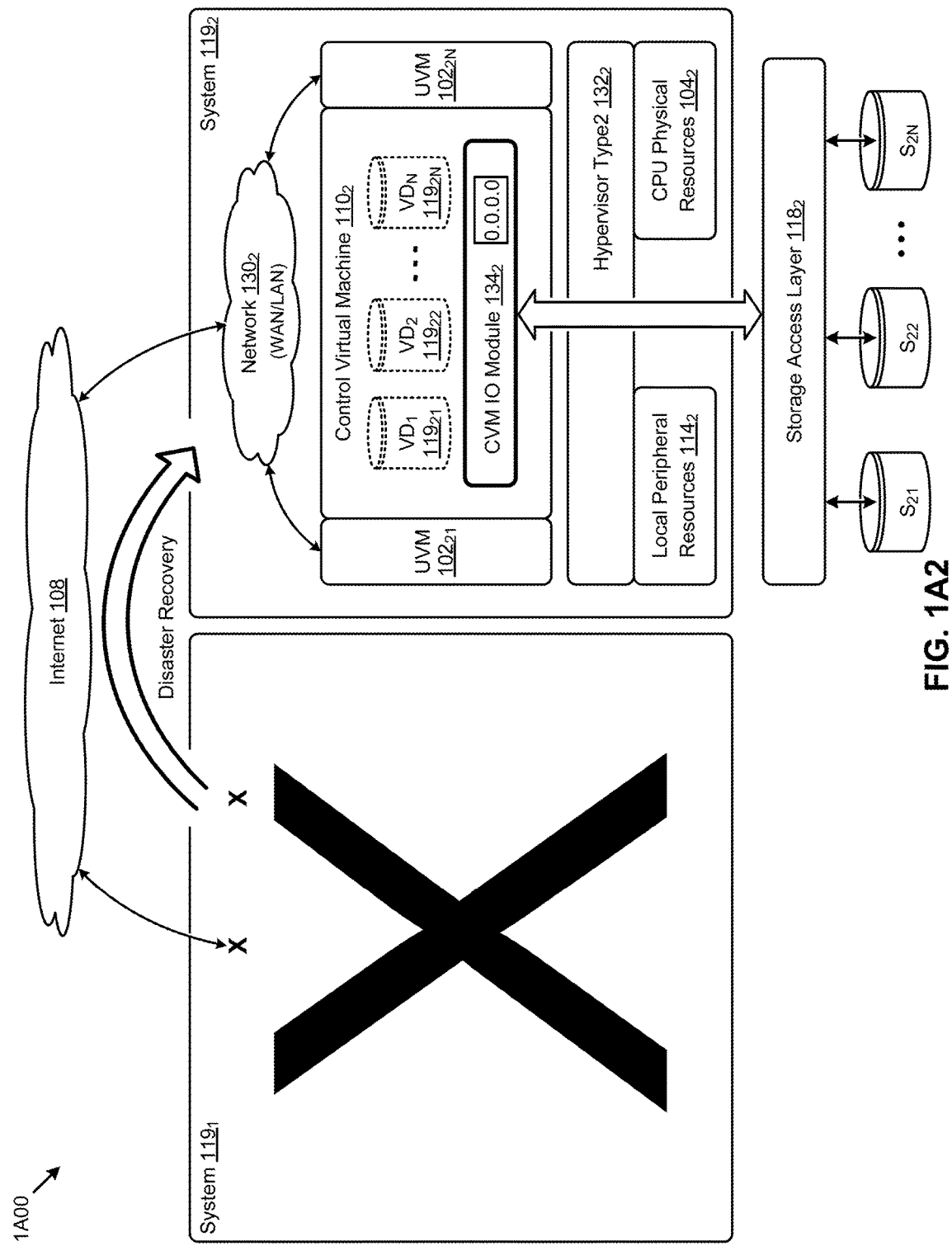
FIG. 1A2

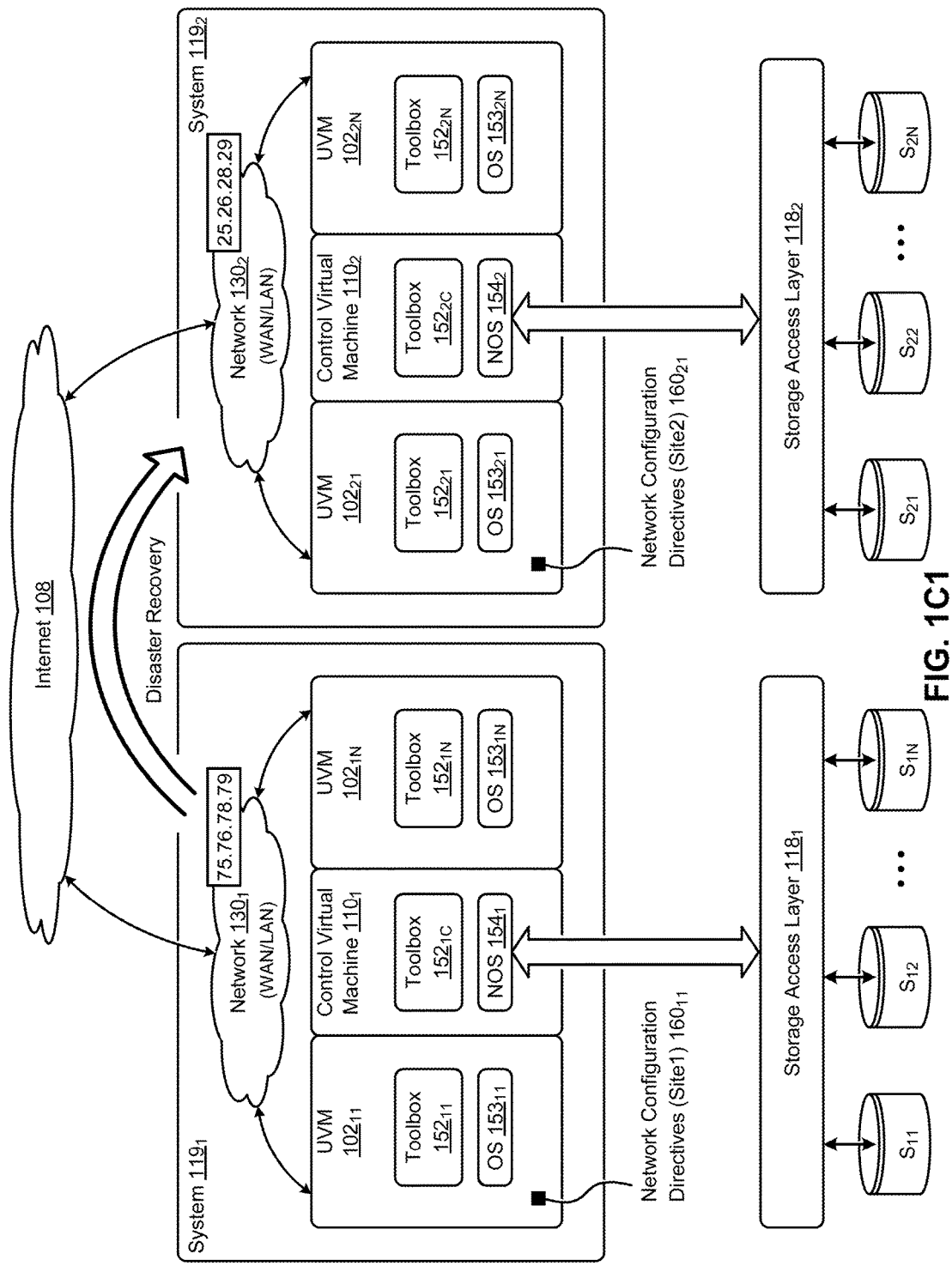
FIG. 1C1

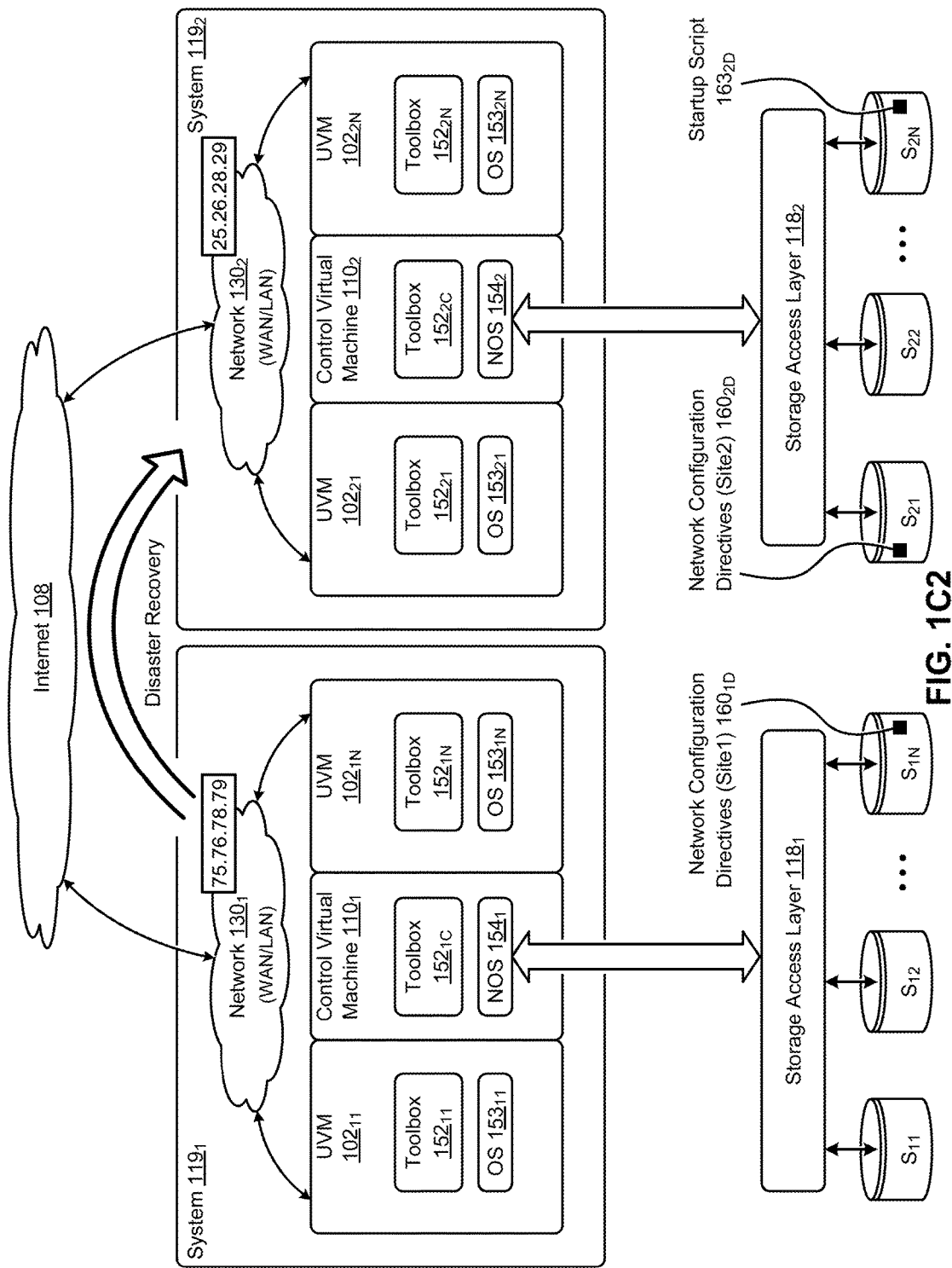
FIG. 1C2

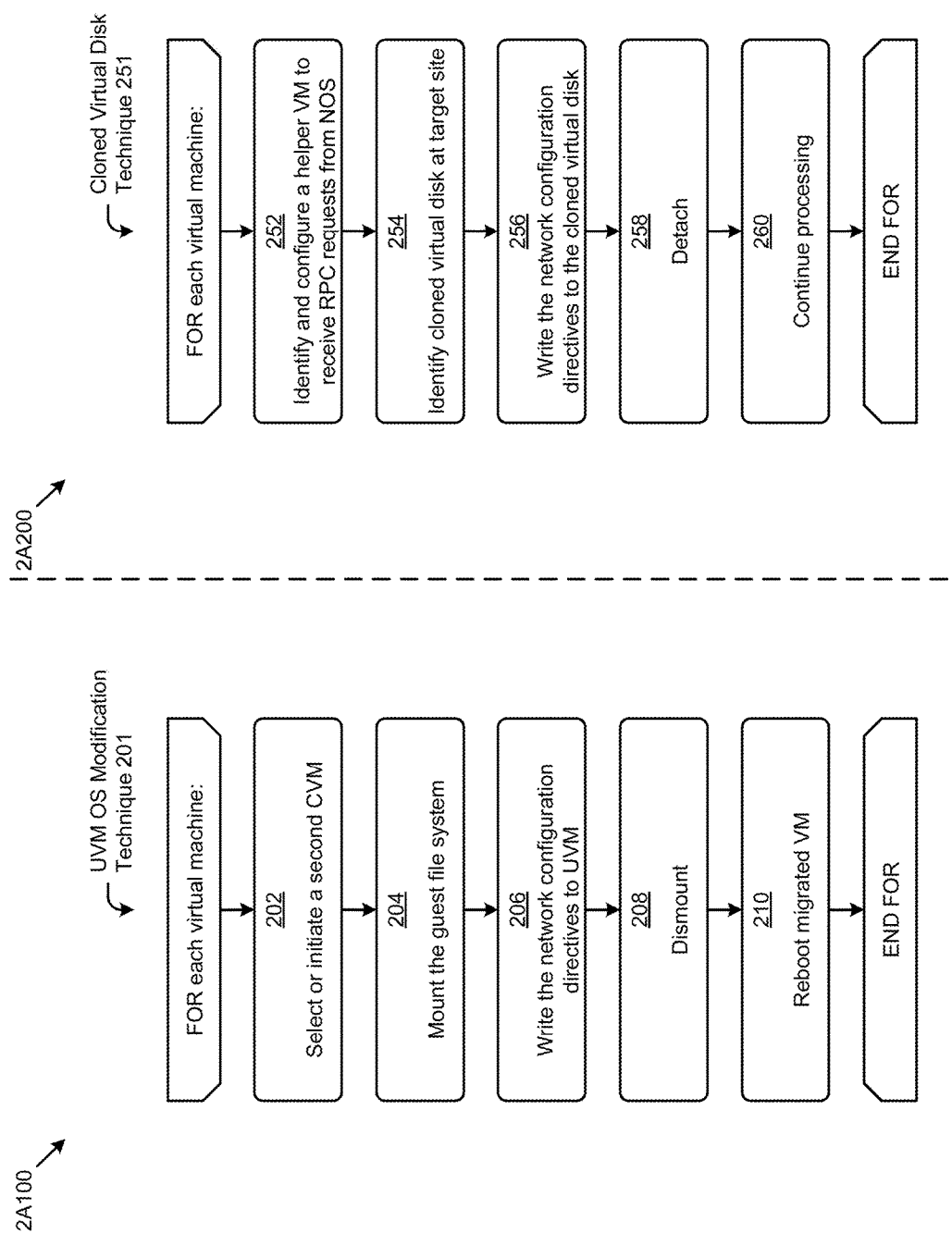

NETWORK RECONFIGURATION IN HYPERVISOR-AGNOSTIC DISASTER RECOVERY SCENARIOS

FIELD

This disclosure relates to bring-up of virtual machines in disaster recovery scenarios, and more particularly to techniques for hypervisor-agnostic network reconfiguration when restarting virtual machines in remote sites.

BACKGROUND

An aspect of modern disaster recover workflows is the ability to control network configuration for virtual machines when they are migrated to a remote site (e.g., from one cluster to another cluster), and then restarted on the remote site. The networks, and hence network configurations (e.g., IP addresses, ports used, etc.), differ from site to site and, accordingly, a migrated virtual machine would need to be reconfigured so as to match the configuration of the network that is present at, and accessed from, the remote site. Furthermore, virtual machines can be started on remote sites under different hypervisors, which might require still additional reconfiguration of the migrated virtual machines.

Hypervisors vary widely in their capabilities and configuration from site to site, and hypervisor implementations do not provide any standardized way to reconfigure network access on behalf of a migrated virtual machine. Legacy approaches sometimes involve use of a hypervisor backdoor, however not all hypervisors support such a backdoor; moreover, for security and other reasons, administrator and/or guest credentials are needed for backdoor or other private network accesses. Some legacy configurations permit changing the IP address of a guest, however this legacy technique still fails to provide any standardized way to reconfigure the network on behalf of a migrated virtual machine. Some legacy techniques implement a dynamic host configuration scheme, however that technique fails to consider static IP installations. Some legacy techniques involve manual reconfigurations, however that does not scale well as the number of virtual machine gets larger and/or the frequency of migrations increase.

What is needed is a technique or techniques to improve over legacy approaches.

BRIEF DESCRIPTION OF THE DRAWINGS

The drawings described below are for illustration purposes only. The drawings are not intended to limit the scope of the present disclosure.

FIG. 1A1 and FIG. 1A2 exemplify a migration scenario.

FIG. 1C1 and FIG. 1C2 depict a set of guest virtual machine migration steps performed during hypervisor-agnostic network reconfiguration when restarting virtual machines in remote sites, according to some embodiments.

FIG. 2A1 presents a disaster recovery flow that modifies a VDisk instance of a guest virtual machine, according to some embodiments.

FIG. 2A2 presents a disaster recovery flow that modifies a cloned virtual disk of a guest virtual machine, according to some embodiments.

DETAILED DESCRIPTION

Figure 1B:
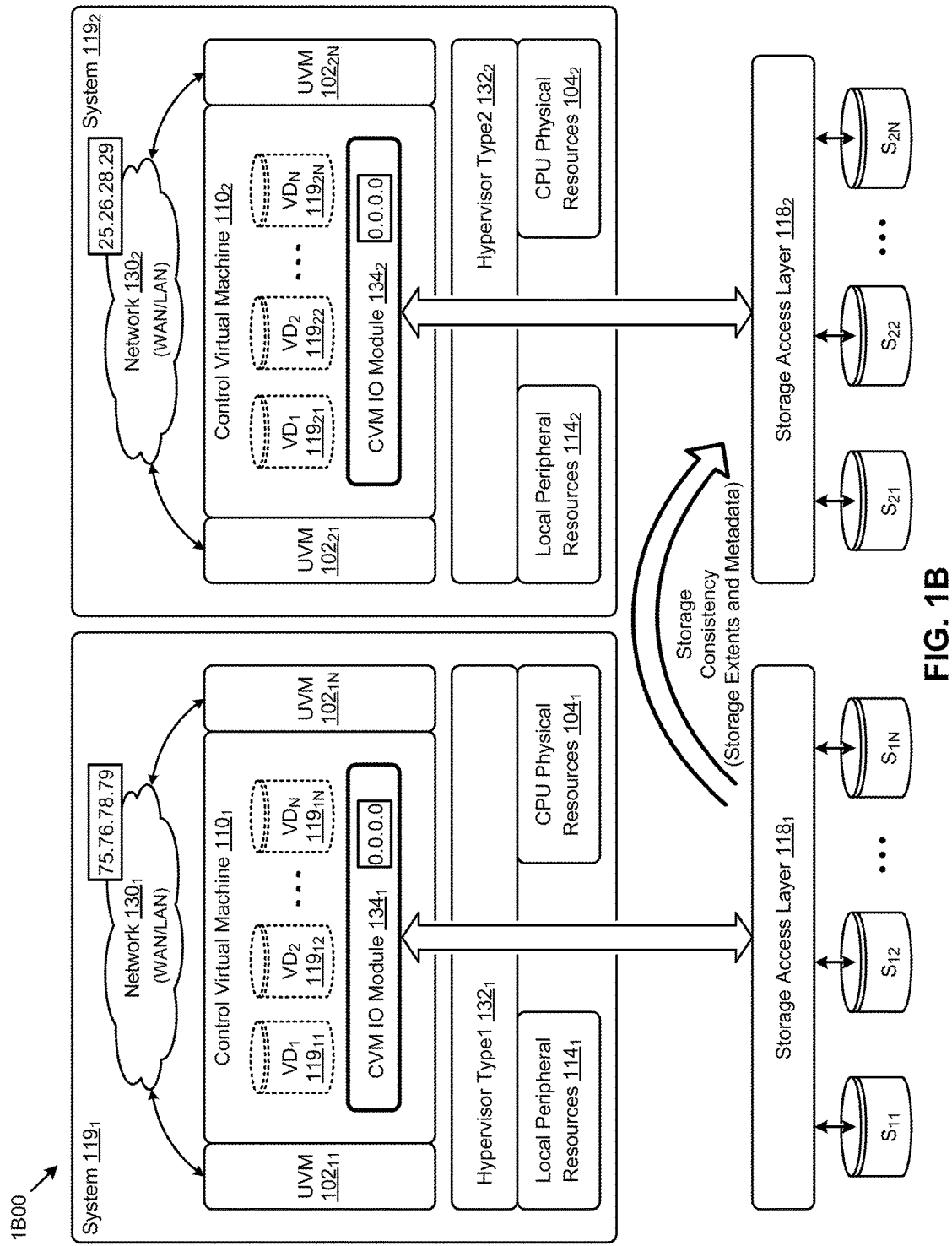
FIG. 1B is an illustration showing a persistent data migration flow performed during hypervisor-agnostic network reconfiguration, according to an embodiment.

Some embodiments of the present disclosure address the problem of performing guest network reconfiguration without requiring guest credentials and without requiring the hypervisor to access the guest over a private network or a backdoor, and some embodiments are directed to approaches to provide a generic, hypervisor-agnostic method to configure the guest network after migration from one system to another system. More particularly, disclosed herein and in the accompanying figures are exemplary environments, systems, methods, and computer program products for hypervisor-agnostic network reconfiguration when restarting virtual machines in remote sites.

OVERVIEW

Consider the ranges of situations where a virtual machine needs to be migrated from a first system with a first set of network parameters to second system with a second set of network parameters. In such a migration it happens that the first system hosts hypervisors of a first type, and the second system hosts hypervisors of a second type. After any storage migrations have been completed (e.g., migration of virtual disks and virtual machine metadata), a network configuration directive file is provided to the guest such that the migrated virtual machine will reconfigure its network configuration once it is invoked after migration to the second system. One technique involves mounting the guest file system using a predefined and pre-installed toolbox. Another technique uses a helper virtual machine (VM) that hosts a remote procedure call (RPC) service to accept requests from a network operation system (NOS) service. Either of these (and/or other techniques) can be used when a first system invokes a set of acts to store (e.g. at a location accessible to the second system), a set of network configuration directives pertaining to the second system.

After migration of a particular guest virtual machine, (e.g., once the migrated guest virtual machine is invoked after being moved to the second system), and before the particular guest's network needs to reconfigured, the network configuration directive file is read by the migrated virtual machine, and the parameters therein are used to configure access to the network of the second system. In some cases the network configuration directive file had been installed into the operating system image of the particular guest virtual machine. In other cases, the network configuration directive file is stored on a disk corresponding a virtual disk clone that is created during migration. The location of the network configuration directive file that is stored on the disk can be predefined such that when the migrated virtual machine boots up in the second system, the migrated virtual machine will look for and read the network configuration directive file, and using those parameters, will reconfigure the network of the second system. The disclosure herein discusses techniques to mount the guest file system via use of an open source tool called "guestfish" as well as techniques to attach the guest operating system disk to a helper virtual machine.

The aforementioned first system and second system can be organized in any distributed architecture or topology (e.g., site-to-site, hub-and-spoke, mesh, etc.) and migration can be performed in any direction (e.g., site1 to site2, or site2 to site1, etc.) for any of a variety of reasons (e.g., session-level high availability, load balancing, disaster recovery planning, etc.). A first system and a second system can be bounded by a particular geography, or by a particular cluster, or by any collection of processing components that can be deemed into a fault boundary.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A1 and FIG. 1A2 exemplify a migration scenario 1A00. As an option, one or more variations of migration scenario 1A00 or any aspect thereof may be implemented in the context of the architecture and functionality of the embodiments described herein. Also, the migration scenario 1A00 or any aspect thereof may be implemented in any environment.

Virtual machines running under a hypervisor can implement a wide variety of enterprise, scientific, and other computing applications. In many cases, an extremely high degree of availability is demanded by the users of the applications and associated data (e.g., for mission-critical performance of computing using mission-critical data). To achieve high availability—even in the presence of a catastrophic event—various disaster recovery plans have been devised. For example, multiple systems (e.g., system $119_1$ system $119_2$) in multiple geographically distant locations are organized into a topology that suits a corresponding disaster plan. For example, one site (e.g., system $119_1$) might be located on one continent and a second site (e.g., system $119_2$) might be located on another continent. Such systems (e.g., system $119_1$ system $119_2$) might each host some local networking services (e.g., switches, routers, backbones, leased lines, etc.) so as to facilitate communication to and from applications through a LAN/WAN (e.g., network $130_1$) and/or to and from the internet 108. Furthermore, to facilitate various data-oriented functions (e.g., data abstractions, data snapshotting, etc.), storage (e.g., storage $S_{11}$, storage $S_{12}$, storage $S_{1N}$) can be accessed via a storage access layer $118_1$.

In many modern settings, the aforementioned applications can be implemented as virtual machines (VMs) that run on top of a supervisory layer (e.g., hypervisor $132_1$), which in turn operates on a central processing unit (e.g., composed of sets of CPU physical resources $104_1$), possibly also using local memory and peripheral resources (e.g., local peripheral resources $114_1$).

In this setting, application often takes the form of an organized set of guest virtual machines (e.g., user virtual machines) that run as separate processes, each of which can implement or emulate an application in whole or in part (e.g., see UVM $102_{11}$, UVM $102_{1N}$). Storage functions are provided by a virtual machine in the form of a specialized virtual machine such as is embodied as a control virtual machine (CVM) that serves various storage-related functions. For example, and as shown, a control virtual machine can facilitate user VM access to virtual disks (e.g., $VD_1$ $119_{11}$, $VD_2$ $119_{12}$, $VD_N$ $119_{1N}$, etc.). The control virtual machine manages storage objects as are needed by the user virtual machines. A virtual machine can create and own a virtual disk, whereas a control virtual machine facilitates access to the storage areas where the virtual disk data is materialized. Management of any number and configuration of such virtualized disks is facilitated by the structure and content of storage metadata, which in turn refers to areas of storage where virtual disk data is materialized. The materialized data can be referred to and/or associated with a unique identification and/or a set of locations, a set of access rights, etc.).

A control virtual machine CVM (e.g., control virtual machine $110_1$) can host one or more daemons (e.g., CVM IO module $134_1$). UVMs can communicate to each other and/or to CVMs using IP networking. As shown the CVM IO module listens and responds to the IP address "0.0.0.0", however, other IP addresses are possible.

In formulating a disaster plan, steps are taken ahead of any such disaster so as to as preserve as much about the state of the system as possible such that, in the event of a disaster, a second system (e.g., possibly a geographically distant system) can "take over" in a state that is more or less the same as was present in the first system at the instant of the disaster.

Preservation of state can take many forms, some which are discussed hereunder. For example, the state of data (e.g., in the form of persistent storage and metadata) can be preserved and updated periodically by taking data snapshots between a first system and a second system (see FIG. 1B). Further, preservation of a list or set of virtual machines that are to be deployed on the second system can be cloned and updated at a second or third or Nth system (e.g., using snapshotting techniques).

The network configuration settings at the second or third or Nth system might be different from the first site. For example, the WAN/LAN equipment at the second site (e.g., see network $130_2$) might be different from the WAN/LAN equipment at the first site. Also, the static IP addresses at the second site would most likely be different at the second site as compared to the first site. If the first site were to experience a catastrophic failure, then even if the state of the application data were perfectly up to date, and even if all of the virtual machines were restarted at the second site, the network configuration settings of the second site would need to be observed by all virtual machines so as to resume communications through (for example) the Internet 108.

FIG. 1A2 depicts one possible failure/recovery scenario where the second system is substantially congruent to the first system. As depicted, a first system (e.g., system $119_1$) experiences a catastrophic event such that no communication into or out of the first system is possible. Such an event can be detected by a second system (e.g., system $119_2$) using a heartbeat monitor or by using any known technique.

In accordance with the disaster recovery plan that underlies this particular example, the disaster recovery plan includes bringing up a second system that has substantially the same characteristics as the first system at the moment just before the catastrophic event. Continuing this example, after completion of recovery, the second system will have configured local networking services (e.g., switches, routers, backbones, leased lines, etc.); storage (e.g., storage $S_{21}$, storage $S_{22}$, storage $S_{2N}$) that can be accessed via a storage access layer $118_2$; a supervisory layer (e.g., hypervisor $132_2$) that operates on a central processing unit (e.g., composed of set of CPU physical resources $104_2$), possibly also using its local memory and its peripheral resources (e.g., local peripheral resources $114_2$); and possibly already hosting a set of user virtual machines (e.g., UVM $102_{21}$, UVM $102_{2N}$).

The supervisory layer embodied as hypervisor $132_2$) can be of the same type (e.g., Type1) as was present on the failed system, or can be of a different type (e.g., Type2, as shown).

The shown control virtual machine $110_2$ hosts one or more daemons (e.g., CVM IO module $134_2$), and the UVMs can communicate to each other and/or to CVMs using IP networking. As shown the CVM IO module $134_2$ listens and respond to the IP address "0.0.0.0" (the same IP address as was in use on the failed system just prior to the failure.

The reconfigured virtual disks (e.g., $VD_1$ $119_{21}$, $VD_2$ $119_{22}$, $VD_N$ $119_{2N}$, etc.) are different instances of the same virtual disks as were present in the failed first system. The data comprising the aforementioned virtual disks is substantially the same as was the case just prior to the failure event (see FIG. 1B)

FIG. 1B is an illustration showing a persistent data migration flow 1B00 performed during hypervisor-agnostic network reconfiguration. As an option, one or more variations of a persistent data migration flow 1B00 or any aspect thereof may be implemented in the context of the architecture and functionality of the embodiments described herein. Also, the persistent data migration flow 1B00 or any aspect thereof may be implemented in any environment.

The embodiment shown in FIG. 1B is merely one example to illustrate one technique for maintaining substantially up-to-date clones of persistent storage. In this example, changes to data among storage devices of the first system (e.g., see the storage device $S_{11}$, storage device $S_{12}$, storage device $S_{1N}$) are replicated onto storage devices of the second system for access by the second system (e.g., see the storage device $S_{21}$, storage device $S_{22}$, storage device $S_{2N}$ of the second system).

Further details regarding a general approach to maintaining substantially up-to-date clones of persistent storage are described in U.S. application Ser. No. 14/206,924, filed Mar. 12, 2014 titled, "METHOD AND SYSTEM FOR IMPLEMENTING VIRTUAL MACHINE IMAGES", which is hereby incorporated by reference in its entirety.

Although the cloned storage may in some cases be perfectly up to date, and although many characteristics of the UVMs, CPU physical resources, and local peripheral resources may be similar and/or of identical designs, it is possible that the network configuration settings between the first system and the second system differ substantially. Strictly as one example, a static IP address used at the first site (e.g., see "75.76.78.79") might be different at the second site (e.g., see "25.26.28.29").

FIG. 1C1 and FIG. 1C2 depict a set of guest virtual machine migration steps performed during hypervisor-agnostic network reconfiguration when restarting virtual machines in remote sites. As an option, one or more variations of guest virtual machine migration steps or any aspect thereof may be implemented in the context of the architecture and functionality of the embodiments described herein. Also, the guest virtual machine migration steps or any aspect thereof may be implemented in any environment.

As shown in FIG. 1C1, set network settings are provided as network configuration directives $160_{11}$. These pertain to the network configuration at the shown "Site1". Another set of network settings are provided as network configuration directives $160_{21}$. These pertain to the network configuration at the shown "Site2". When UVMs (e.g., UVM $102_{21}$, UVM $102_{2N}$, etc.) are brought up in the context of a disaster recovery situation (e.g., at "Site2"), the UVMs will need to access that network configuration directives $160_{21}$ that pertain to the network configuration at the shown "Site2". Disclosed herein are techniques to provide access by the UVMs to the network configuration directives $160_{21}$ that pertain to the network configuration at the shown "Site2". One such technique involves use of facilities within a set of code (e.g., toolbox $152_{21}$, toolbox $152_{2C}$, toolbox $152_{2N}$). Such a set of code is linked-in or otherwise accessible to each virtual machine, including the virtual machines that are brought up on a first system (e.g., toolbox $152_{11}$, toolbox $152_{1C}$, toolbox $152_{1N}$) as well as on virtual machines that are brought up on a second system (e.g., toolbox $152_{21}$, toolbox $152_{2C}$, toolbox $152_{2N}$). Variants of such a toolboxes include access to or configuration of a guest VM operating system (e.g., see OS $153_{11}$, OS $153_{1N}$, OS $153_{21}$, OS $153_{2N}$) and/or of a CVM network operating system NOS (e.g., see NOS $154_1$, NOS $154_2$). Such a NOS can be the same operating system of a guest VM operating system, or a NOS can be a variant of the same operating system of a guest VM operating system, or a NOS can be a different operating system of a guest VM operating system. Access and uses of the operating systems of the VMs and of the operating systems CVMs are shown and described as pertaining to the following figures. In particular, certain of the following figures show and describe how an operating system of a CVM can hold network configuration directives. More particularly, certain of the following figures depict how a toolbox can be used by a first system to direct a second system to formulate and store one or more a network configuration directive files that is accessible by the second system even when the first system has experienced some disaster event.

As shown in FIG. 1C2, set network settings are provided as network configuration directives $160_{1D}$. These pertain to the network configuration at the shown "Site1". Another set of network settings are provided as network configuration directives $160_{2D}$. These pertain to the network configuration at the shown "Site2". When UVMs (e.g., UVM $102_{21}$, UVM $102_{2N}$, etc.) are brought up in the context of a disaster recovery situation (e.g., at "Site2"), the UVMs will need to access network configuration directives $160_{2D}$ that pertain to the network configuration at the shown "Site2". Disclosed herein are techniques to provide access by the UVMs to the network configuration directives $160_{2D}$ that pertain to the network configuration at the shown "Site2". One such technique involves persistent storage of network configuration directives prior to a catastrophic event (e.g., as a part of implementation of a disaster recovery plan).

When virtual machines come up at the recovery site (e.g., "Site2" as shown), they will access the network configuration directives $160_{2D}$ from a known location (e.g., as may be pre-determined in a disaster recovery plan). As can be observed, access to the storage $S_{21}$, $S_{22}$, $S_{2N}$ is accessible by the shown control virtual machine $110_2$, and access to the storage $S_{21}$, $S_{22}$, $S_{2N}$ by UVMs is in turn provided by access through shown control virtual machine $110_2$ (e.g., at "Site2" as shown).

Figure 4:
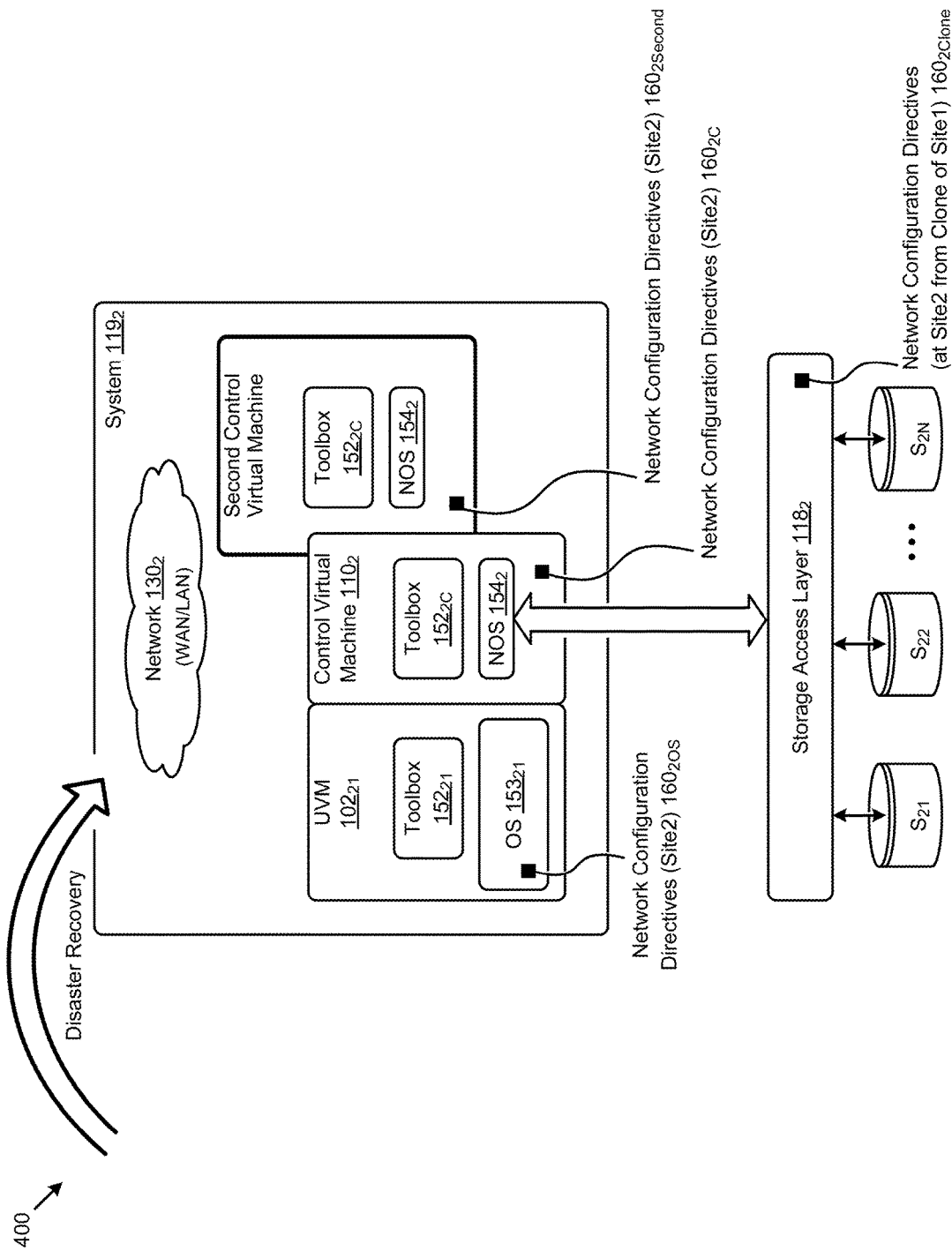
FIG. 4 presents a control virtual machine (CVM) used in a CVM-facilitated restart technique performed during hypervisor-agnostic network reconfiguration when restarting virtual machines in remote sites, according to some embodiments.

FIG. 2A1 presents a disaster recovery flow 2A100 that modifies a VDisk instance of a guest virtual machine. The embodiment shown in FIG. 2A1 is merely one example. As shown (see UVM OS modification technique 201), the steps serve to mount the guest file system via a tool (e.g., a tool from the toolbox $152_{2C}$, or a modified version of open source tool called "guestfish"). The tool can interface to an NFS mount point. However, it is not ideal to loopback mount a disk on the same gateway where it is hosted. The tool runs from a CVM other than the one hosting the VDisk to be modified (see the second control virtual machine as shown in FIG. 4).

Catastrophic Event

After a catastrophic event, a tool reads a startup script $163_{2D}$ (shown in FIG. 1C1) and for each VM to be brought up in the remote site, the tool will select an ancillary control virtual machine to be launched (see step 202). This ancillary virtual control machine is different than the control virtual machine $110_2$, so the guest virtual machines (e.g., UVMs) brought up in this flow can communicate with the control virtual machine in the same manner as they had been doing on the failed system. This ancillary virtual control machine mounts the guest virtual machine's file system (see step 204) or file system components (e.g., user VDisks). The ancillary virtual control machine selects a next VM to be brought up in the remote site, then proceeds to write an instance of the network configuration directives to the VDisk of the selected VM (see step 206). The tool can then dismount (see step 208) from the selected VM and reboot the VM (see step 210). When the rebooted VM comes up, it will have access to the network configuration directives that pertain to the remote site.

The technique of FIG. 2A1 is merely one technique that can be used to provide access to network configuration directives to a VM in a recovery situation. The discussions pertaining to FIG. 2A2 and FIG. 4 depict another possible techniques.

FIG. 2A2 presents a disaster recovery flow 2A200 that modifies a cloned virtual disk of a guest virtual machine. The embodiment shown in FIG. 2A2 is merely one example. This technique (see cloned virtual disk technique 251) uses an, extremely lightweight helper VM. This helper VM hosts an RPC service to accept requests from NOS services. When a particular guest's network needs to be reconfigured (e.g., in a failure/recovery situation), the disk corresponding to the clone that is brought online during recovery is attached to this helper VM. Once attached, a network configuration directives file is written into a pre-determined location on this disk (e.g., predetermined as in the context of development of a disaster recovery plan). At this point the disk is detached. When a VM boots up, the VM looks for this file and reconfigures the network using the network configuration directives.

More specifically, and as shown, an RPC service is configured so as to accept requests from NOS services (see step 252). When a particular guest's network needs to be reconfigured (e.g., in a failure/recovery situation), the VDisk corresponding the VDisk clone (e.g., that is brought online during recovery) is identified and attached to this helper VM (see step 254). Once attached, a descriptor file is written into a pre-determined location on the identified disk (see step 256). At this point the VDisk is detached (see step 258). Processing continues (see step 260) such that when the VM boots up, the VM (e.g., possibly using a toolbox tool or other agent) looks for this file and reconfigures the network. Variations of the aforementioned toolbox tool or other or agent provide a secure way to access a guest virtual machine.

Figure 2B:
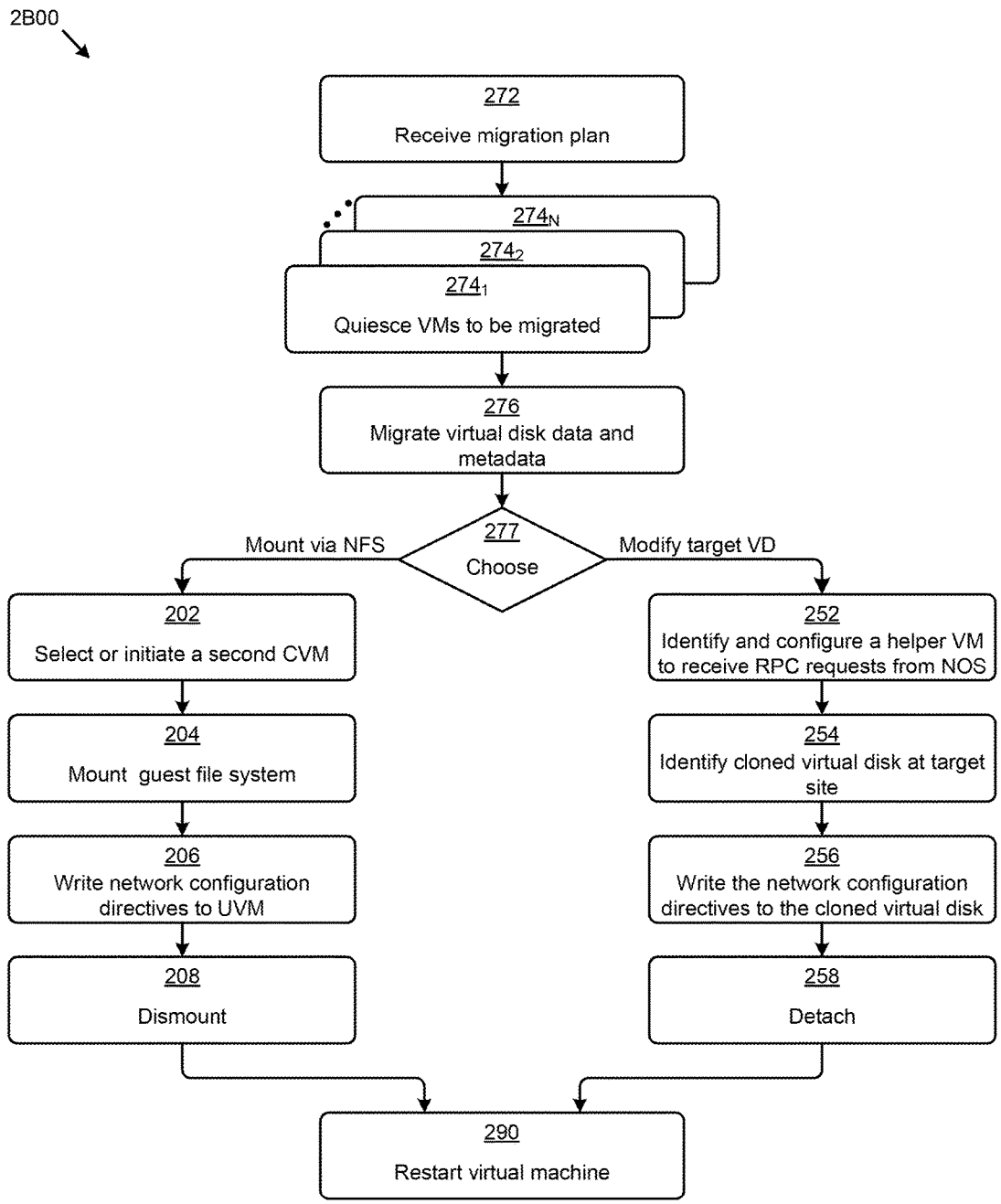
FIG. 2B presents a planned migration recovery flow performed during hypervisor-agnostic network reconfiguration, according to some embodiments.

FIG. 2B presents a planned migration recovery flow 2B00 performed during hypervisor-agnostic network reconfiguration. As an option, one or more variations of planned migration recovery flow 2B00 or any aspect thereof may be implemented in the context of the architecture and functionality of the embodiments described herein. Also, the planned migration recovery flow 2B00 or any aspect thereof may be implemented in any environment.

The embodiment shown in FIG. 2B is merely one example. The techniques that are shown and discussed as pertaining to FIG. 2A1 and FIG. 2A2 can be applied in scenarios other than in response to a failure event and/or in response to carrying out a recovery portion of a disaster recovery plan. In particular, either of the aforementioned techniques of FIG. 2A1 and FIG. 2A2 can be used in any of a variety of migration scenarios. As shown, the recovery flow 2B00 commences upon receiving a migration plan or directive (see step 272). The VMs to be migrated are quiesced (see step $274_1$, step $274_2$ through step $274_N$). Upon quiescence of any particular VM, that VM's data (e.g., snapshots) and metadata (e.g., including one or more instances of startup scripts) can be moved to another system (see step 276) by operation of the startup script. In some cases, one or another technique can be dynamically selected (see decision 277) based on the particular system configuration and/or the nature of the network configuration of the intended target system. The one of a set of alternative virtual machine restart techniques (e.g., UVM OS modification technique 201, cloned virtual disk technique 251, or a custom virtual disk technique) can be dynamically determined (e.g., see decision 277), and processed before restarting a subject virtual machine (see step 290).

Figure 3:
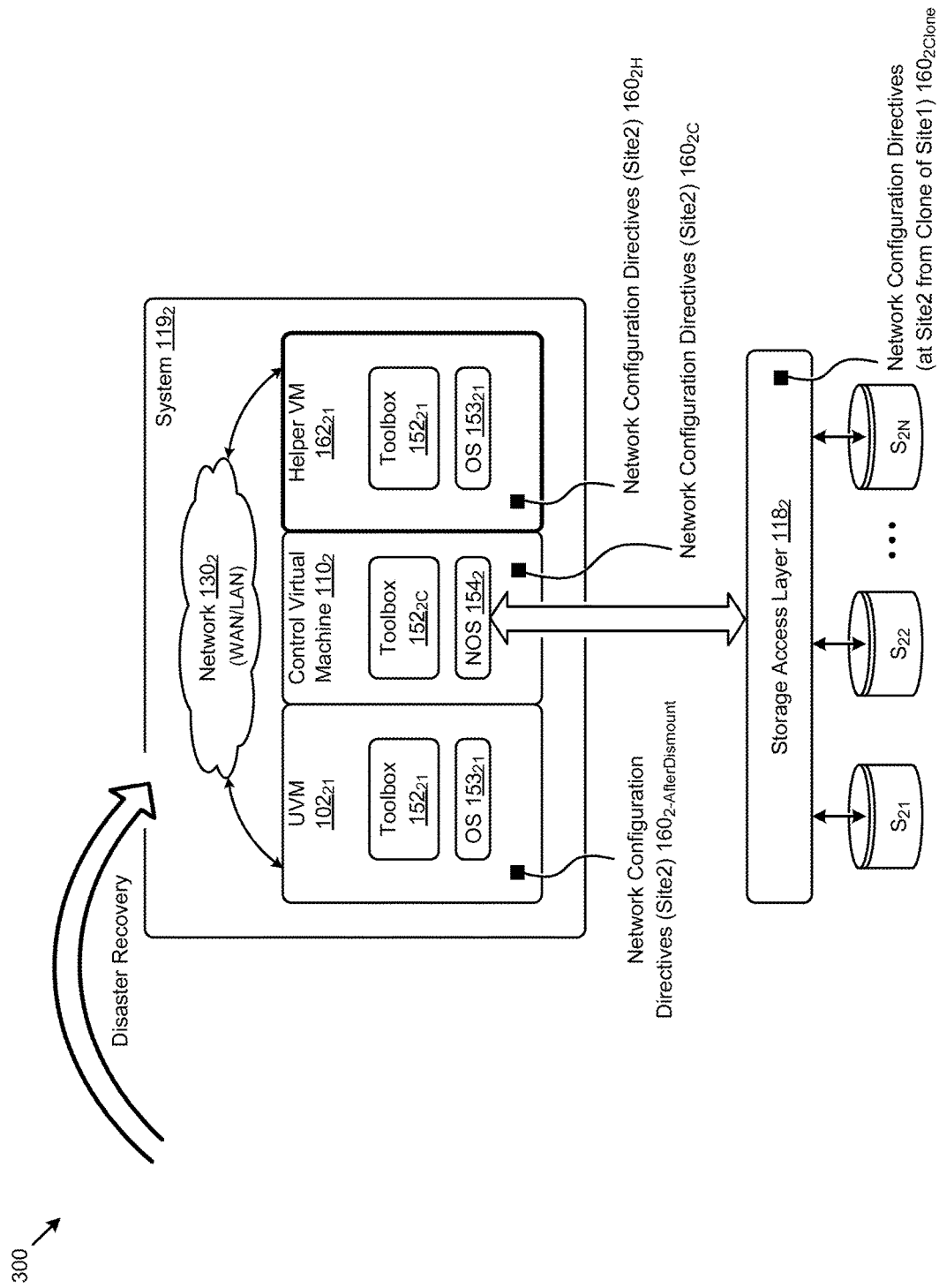
FIG. 3 presents an agent-facilitated restart technique performed during hypervisor-agnostic network reconfiguration when restarting virtual machines in remote sites, according to some embodiments.

FIG. 3 presents an agent-facilitated restart technique 300 performed during hypervisor-agnostic network reconfiguration when restarting virtual machines in remote sites. As an option, one or more variations of agent-facilitated restart technique 300 or any aspect thereof may be implemented in the context of the architecture and functionality of the embodiments described herein. Also, the agent-facilitated restart technique 300 or any aspect thereof may be implemented in any environment.

The figure depicts a helper VM $162_{21}$ that reads an instance of network configuration directives (e.g., from a clone such as network configuration directives $160_{2Clone}$), and provides the remote site network configuration directives to user VMs using the aforementioned helper VM mount/dismount technique (see FIG. 2A1). The helper VM $162_{21}$ can use the same instance of the toolbox $152_{21}$ or can use or different instance of the toolbox $152_{21}$. In some cases, the helper VM $162_{21}$ can use the same instance of the OS $153_{21}$ or can use or different instance of the OS. In still other cases, the helper VM can use a container (e.g., such as is depicted in the containerized architecture of FIG. 8B).

This agent-facilitated restart technique 300 that is used to configure the shown UVM $102_{21}$ results in an occurrence of network configuration directives for site2 (see instance $160_{2\text{-}AfterDismount}$), which occurrence is within or accessible to subject UVMs. The source of network configuration directives for site2 can derive from a helper VM (see instance $160_{2H}$), or can derive from a CVM (see instance $160_{2C}$). Strictly as one example of the foregoing, the network configuration directives for site2 can be derived from network configuration directives within a helper virtual machine (see instance $160_{2H}$).

FIG. 4 presents a control virtual machine (CVM) used in a CVM-facilitated restart technique 400 performed during hypervisor-agnostic network reconfiguration when restarting virtual machines in remote sites. As an option, one or more variations of CVM-facilitated restart technique 400 or any aspect thereof may be implemented in the context of the architecture and functionality of the embodiments described herein. Also, the CVM-facilitated restart technique 400 or any aspect thereof may be implemented in any environment.

The figure depicts an ancillary control virtual machine (e.g., the shown second control virtual machine $110_2$ that reads an instance of network configuration directives (e.g., from a clone such as network configuration directives $160_{2Clone}$), and provides the remote site network configuration directives to user VMs using the aforementioned second control virtual machine VM attach technique (see FIG. 2A2).

This CVM-facilitated restart technique 400 that is used to configure the shown UVM $102_{21}$ results in an occurrence of network configuration directives for site2 (see instance $160_{2OS}$), which occurrence is within or accessible by a subject UVM through its OS $153_{21}$. The source of network configuration directives for site2 can derive from a first CVM (see instance $160_{2C}$), or can derive from an ancillary CVM (see instance $160_{2Second}$). Strictly as one example of the foregoing, the network configuration directives for site2 can be derived from network configuration directives within the ancillary CVM (see instance $160_{2Second}$). In some cases, a storage area is accessed by the ancillary CVM, and is provided to a user VM as an NFS mount point to a location or locations where the network configuration directives for site2 can be found. The user VM can then use or derive network configuration items pertaining to site2.

Figure 5:
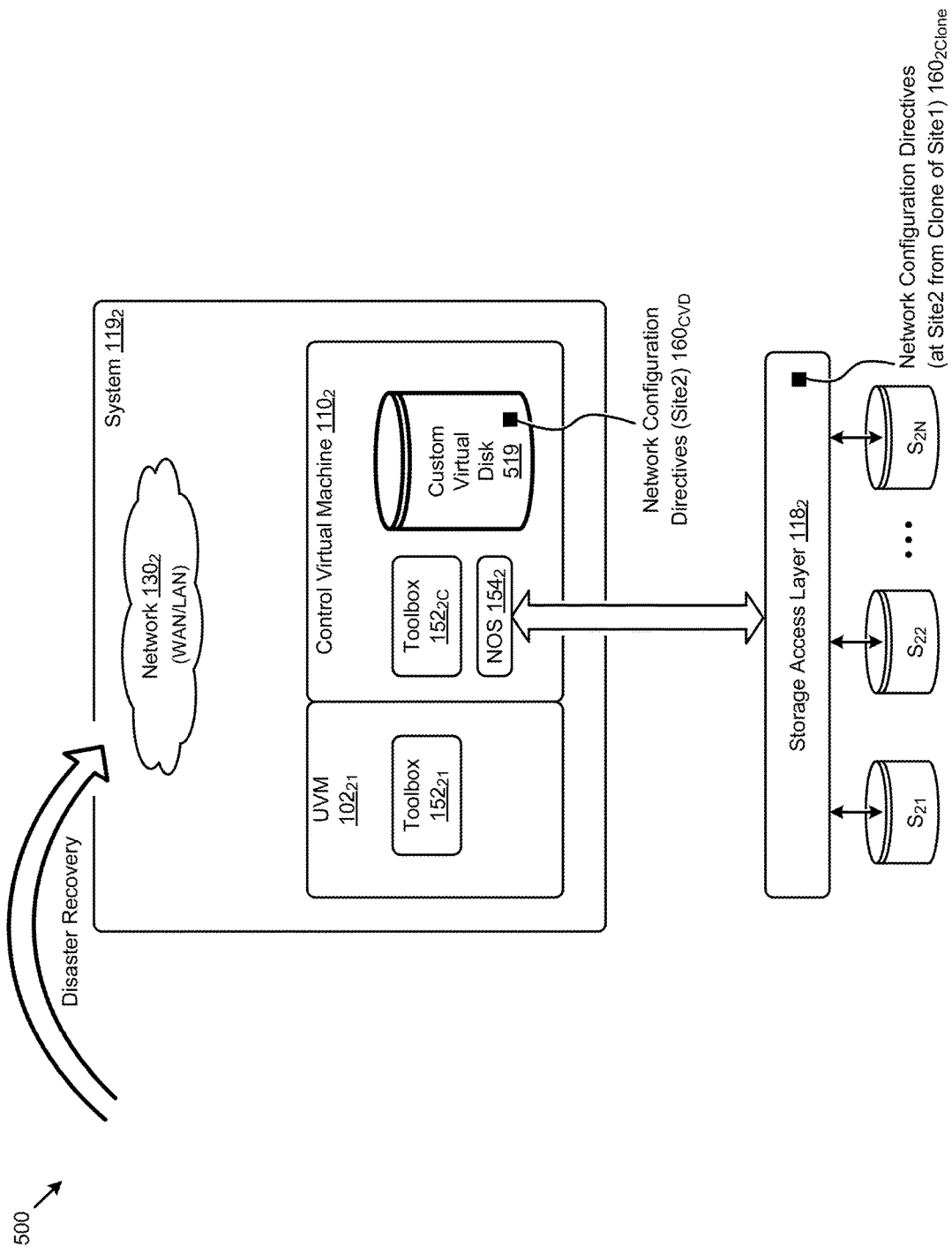
FIG. 5 shows a custom start-up virtual disk (VD) used in a VD-facilitated restart technique performed during hypervisor-agnostic network reconfiguration when restarting virtual machines in remote sites, according to some embodiments.

FIG. 5 shows a custom start-up virtual disk (VD) used in a VD-facilitated restart technique 500 performed during hypervisor-agnostic network reconfiguration when restarting virtual machines in remote sites. As an option, one or more variations of VD-facilitated restart technique 500 or any aspect thereof may be implemented in the context of the architecture and functionality of the embodiments described herein. Also, the VD-facilitated restart technique 500 or any aspect thereof may be implemented in any environment.

The embodiment shown in FIG. 5 is merely one example. As shown, a control virtual machine responds to a failure event by configuring a custom virtual disk 519. (e.g., by reading a startup script after detecting the failure event).

This virtual disk facilitated restart technique is used to configure the shown UVM $102_{21}$. The results in an occurrence of network configuration directives for site2 (see instance $160_{2OS}$), which occurrence is within or accessible by a subject UVM. The source of network configuration directives for site2 can derive from can derive from a custom start-up virtual disk. Strictly as one example of the foregoing, the network configuration directives for site2 that are used by the UVM $102_{21}$ can be derived from the network configuration directives $160_{CVD}$) that are stored in or on the custom virtual disk 519).

Figure 6:
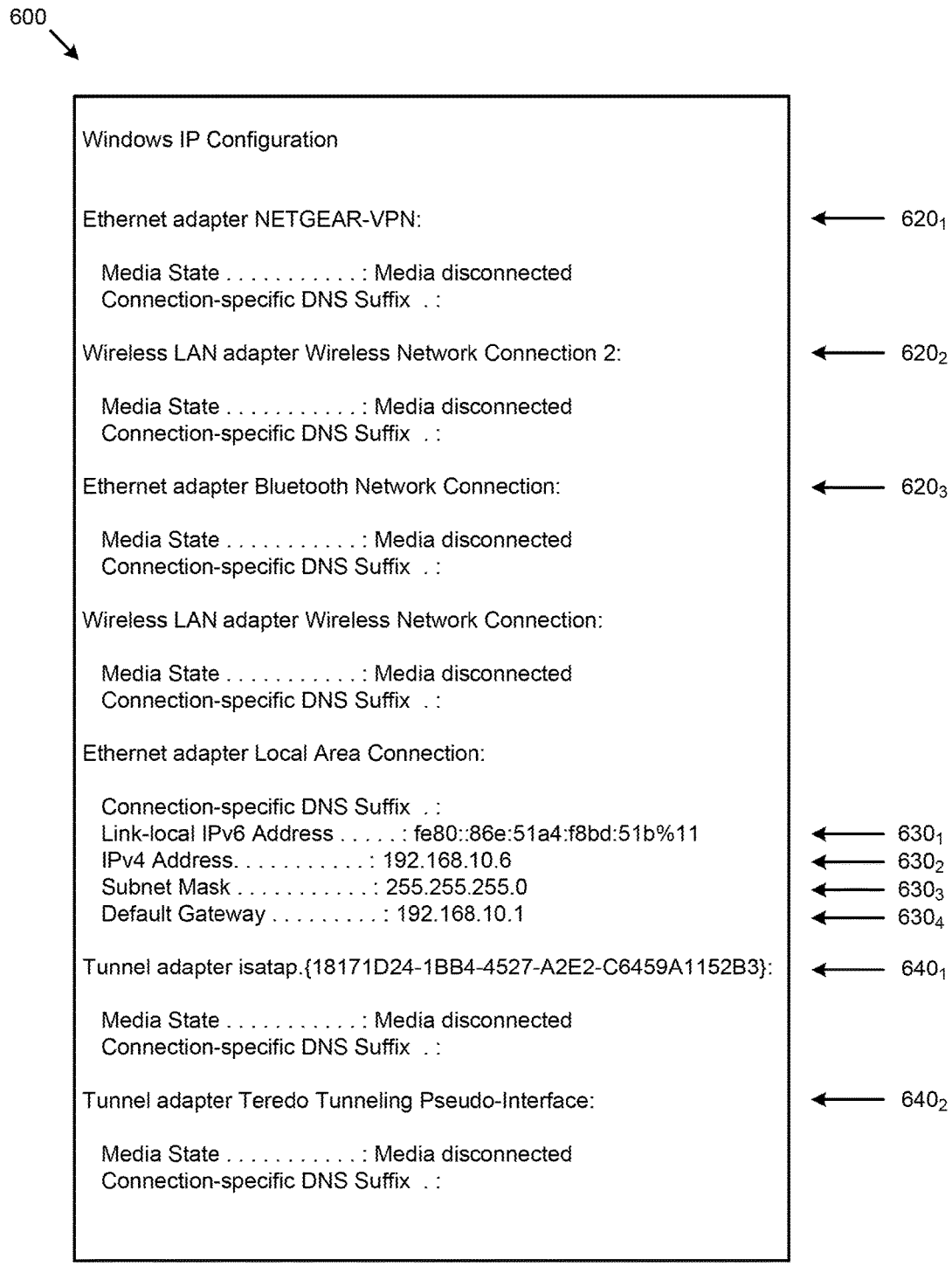
FIG. 6 presents a portion of network configuration file contents as used during hypervisor-agnostic network reconfiguration, according to some embodiments.

FIG. 6 presents a portion of network configuration file contents 600 as used during hypervisor-agnostic network reconfiguration. As an option, one or more variations of network configuration file contents 600 or any aspect thereof may be implemented in the context of the architecture and functionality of the embodiments described herein. Also, the network configuration file contents 600 or any aspect thereof may be implemented in any environment.

The embodiment shown in FIG. 6 is merely one example. A network configuration file can be provided in a text file (e.g., "directives.txt" file) the contents of which occur as text strings.

As shown, the contents of a configuration file can include a description of adapters present in the target site (e.g., see Ethernet adapter identification $620_1$, wireless LAN adapter identification $620_2$, Bluetooth adapter identification $620_3$). Further, any one or more adapters can have adapter specific configurations (e.g., see IPV6 configuration $630_1$, an IPV4 configuration $630_2$, a subnet mask configuration $630_3$, a default gateway configuration $630_4$, etc.). Still further, a configuration file can include a description of tunnel adapters (e.g., see tunnel adapter configuration 640₁ and tunnel adapter configuration 640₂). The foregoing is purely exemplary. Other configuration files can comprise more or fewer or the same or different configuration settings.

ADDITIONAL EMBODIMENTS OF THE DISCLOSURE

Additional Practical Application Examples

Figure 7:
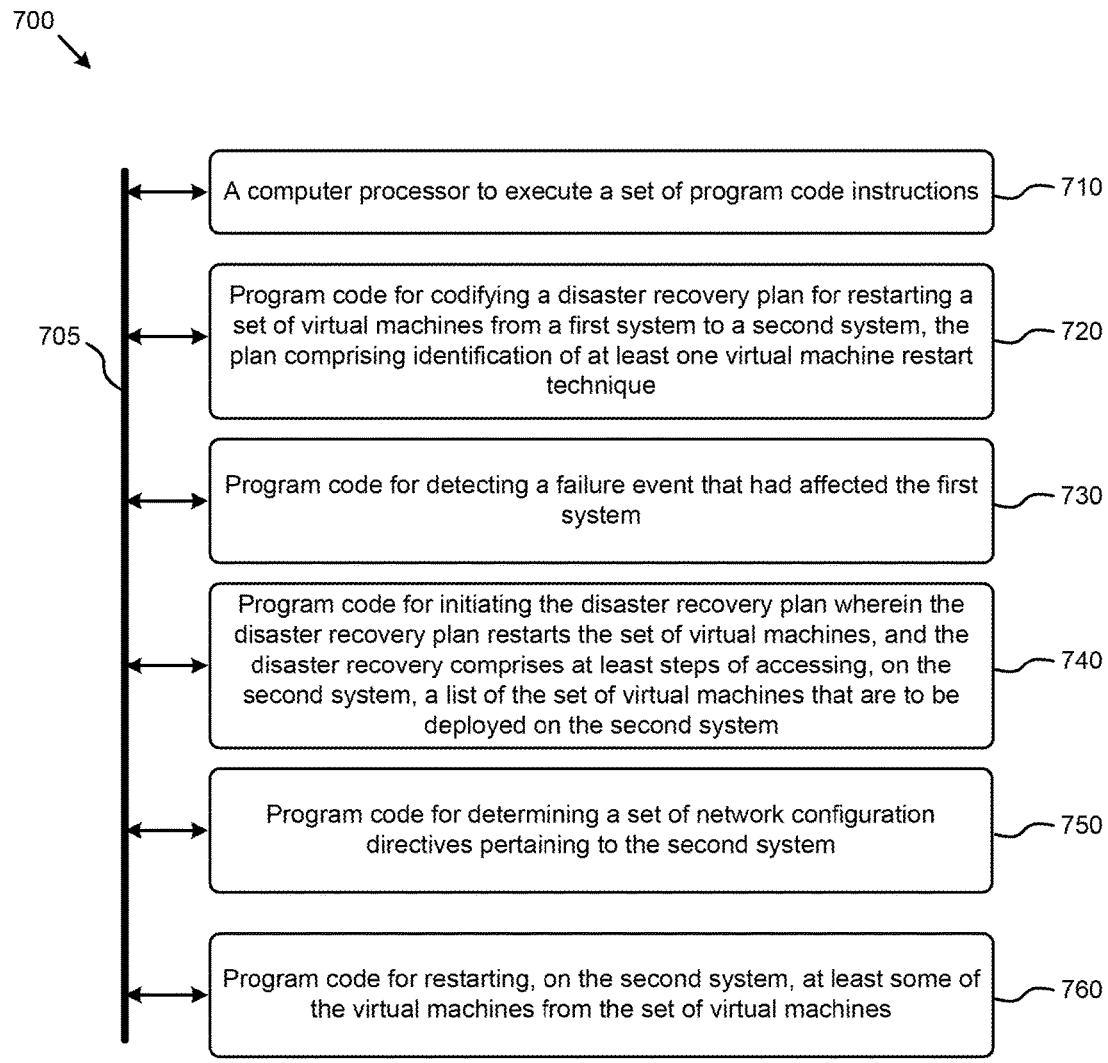
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (see module 710) and modules for accessing memory to hold program code instructions to perform: codifying a disaster recovery plan to restart a set of virtual machines from a first system to a second system, the plan comprising identification of at least one virtual machine restart technique (see module 720); detecting a failure event that had affected the first system (see module 730); initiating the disaster recovery plan wherein the disaster recovery plan restarts the set of virtual machines, and the disaster recovery comprises at least steps of, accessing, on the second system, a list of the set of virtual machines that are to be deployed on the second system (see module 740); determining a set of network configuration directives pertaining to the second system (see module 750); and restarting, on the second system, at least some of the virtual machines from the set of virtual machines to use at least a portion of the network configuration directives pertaining to the second system (see module 760).

System Architecture Overview

Additional System Architecture Examples

Figure 8A:
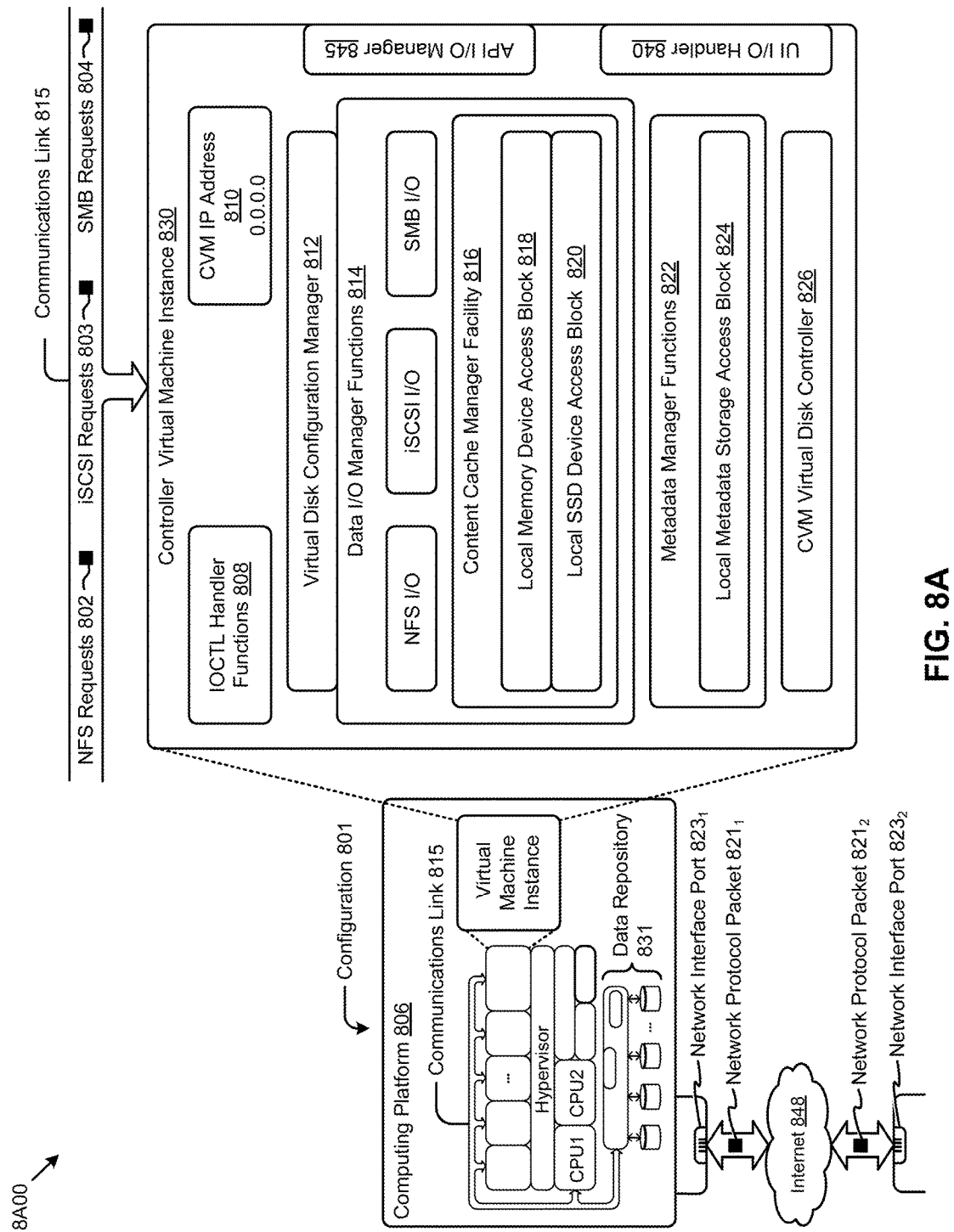
FIG. 8A and FIG. 8B depict architectures comprising collections of interconnected components suitable for implementing embodiments of the present disclosure and/or for use in the herein-described environments.

FIG. 8A depicts a virtual machine architecture 8A00 comprising a collection of interconnected components suitable for implementing embodiments of the present disclosure and/or for use in the herein-described environments. The shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system requests (SMB) in the form of SMB requests 804. The controller virtual machine instance publishes and responds to an internet protocol (IP) address (e.g., see CVM IP address 810). Various forms of input and output (I/O or IO) can be handled by one or more I/O control (IOCTL) handler functions 808 that interface to other functions such as data I/O manager functions 814 and/or metadata manager functions 822. As shown, the data I/O manager functions can include communication with a virtual disk configuration manager 812 and/or can include direct or indirect communication with any of various block I/O functions (e.g., NFS I/O, iSCSI I/O, SMB I/O, etc.).

In addition to block I/O functions, the configuration 801 supports I/O of any form (e.g., block I/O, streaming I/O, packet-based I/O, HTTP traffic, etc.) through either or both of a user interface (UI) handler such as UI I/O handler 840 and/or through any of a range of application programming interfaces (APIs), possibly through the shown API I/O manager 845.

The communications link 815 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 830 includes a content cache manager facility 816 that accesses storage locations, possibly including local DRAM (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831, can be configured using a CVM virtual disk controller 826, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 801 can be coupled by a communications link 815 (e.g., backplane, LAN, PTSN, wired or wireless network, etc.) and each instance may perform respective portions of sequences of instructions as may be required to practice embodiments of the disclosure The shown computing platform 806 is interconnected to the Internet 848 through one or more network interface ports (e.g., network interface port 823$_1$ and network interface port 823$_2$). The configuration 801 can be addressed through one or more network interface ports using an IP address. Any operational element within computing platform 806 can perform sending and receiving operations using any of a range of network protocols, possibly including network protocols that send and receive packets (e.g., see network protocol packet 821$_1$ and network protocol packet 821$_2$).

The computing platform 806 may transmit and receive messages that can be composed of configuration data, and/or any other forms of data and/or instructions organized into a data structure (e.g., communications packets). In some cases, the data structure includes program code instructions (e.g., application code), communicated through Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of hypervisor-agnostic network reconfiguration.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of hypervisor-agnostic network reconfiguration). Such files or records can be brought into and/or stored in volatile or non-volatile memory.

Figure 8B:
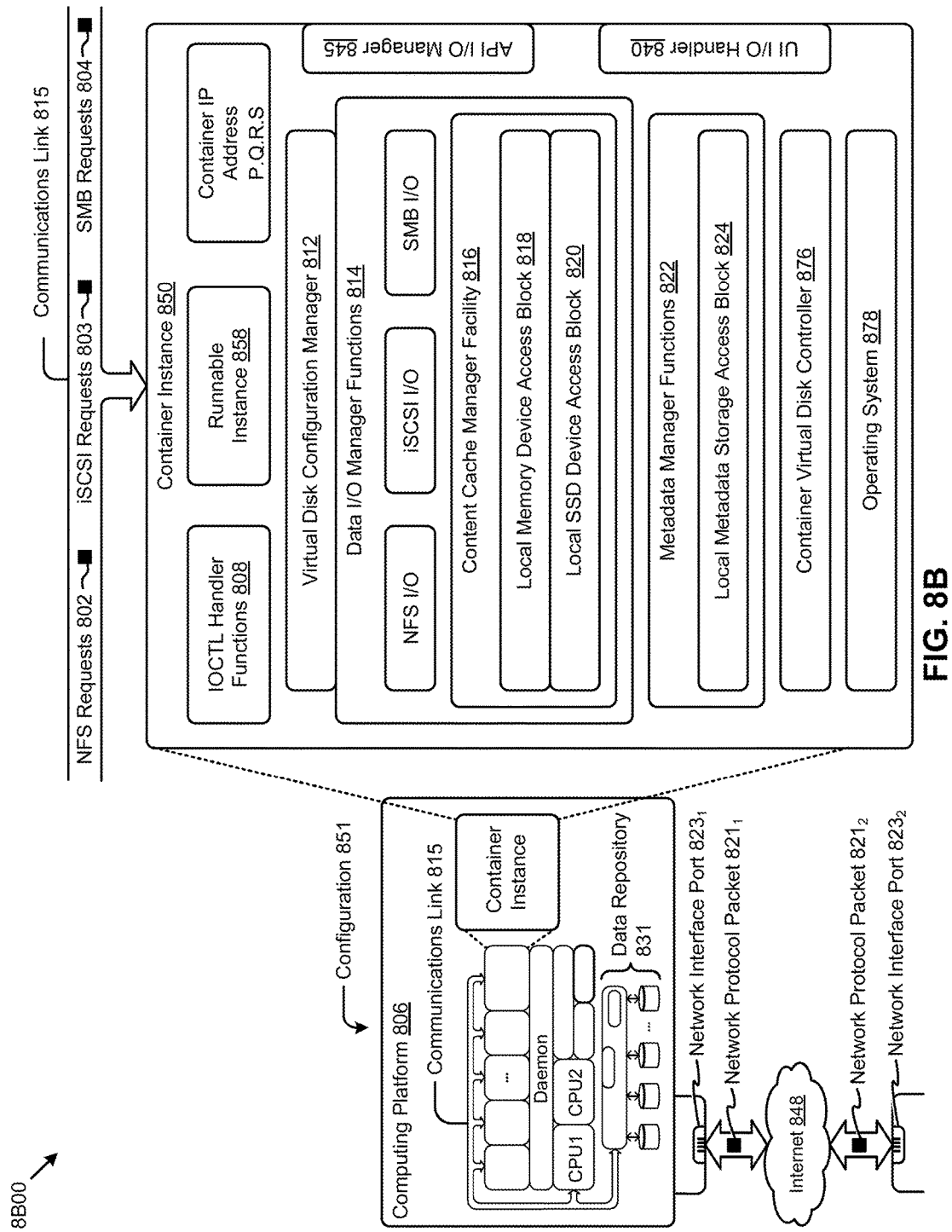

FIG. 8B depicts a containerized architecture 8B00 comprising a collection of interconnected components suitable for implementing embodiments of the present disclosure and/or for use in the herein-described environments. The shown containerized architecture 8B00 includes a container instance in a configuration 851 that is further described as pertaining to the container instance 850. The configuration 851 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls —a", etc.). The container might optionally include an operating system 878, however such an operating system need not be provided. Instead, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data I/O management functions, etc. In some cases, a runnable instance includes code for, and access to a container virtual disk controller 876. Such a container virtual disk controller can perform any of the functions that the aforementioned CVM virtual disk controller 826, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a disaster recovery plan for restarting a set of virtual machines from a first system on a second system, the disaster recovery plan including at least reconfiguration of one or more virtual machines of the set of virtual machines, the first system comprising a first hypervisor and the second system comprising a second hypervisor, the first hypervisor and the second hypervisor being different types of hypervisors, wherein the set of virtual machines from the first system accesses storage devices at the first system through a first controller virtual machine at the first system;
invoking, by the second system, a set of acts to store, at a location accessible to the second system, a set of network configuration directives comprising adapter specific configurations for providing access to a network of the second system through adapters present in the second system, the set of network configuration directives pertaining to the second system;
detecting a failure event at the first system;
accessing, on the second system, the one or more virtual machines a list of the set of virtual machines from the first system that are to be deployed on the second system in response to detecting the failure event at the first system;
implementing a virtual machine at the second system to provide the set of network configuration directives to the one or more virtual machines, wherein the virtual machine provides access to the one or more virtual machines by:
accessing the set of network configuration directives at the second system in response to detecting the failure event at the first system, and
writing the set of network configuration directives to locations accessible to the one or more virtual machines; and
reconfiguring the one or more virtual machines from the first system and on the second system to access the network of the second system using adapters present in the second system, wherein the one or more virtual machines from the first system access storage devices at the second system through a second controller virtual machine at the second system.

2. The method of claim 1, wherein the virtual machine at the second system is a helper virtual machine, and wherein the locations of the set of network configuration directives written are virtual disks associated with the one or more virtual machines that are to be deployed on the second system.

3. The method of claim 2, wherein reconfiguring the one or more virtual machines includes accessing the virtual disks associated with the one or more virtual machines having the set of network configuration directives written by the helper virtual machine.

4. The method of claim 1, wherein the virtual machine at the second system is an ancillary control virtual machine, and wherein the locations of the set of network configuration directives written are cloned virtual disks associated with the one or more virtual machines that are to be deployed on the second system.

5. The method of claim 4, wherein reconfiguring the one or more virtual machines includes accessing the cloned virtual disks associated with the one or more virtual machines having the set of network configuration directives written by the ancillary control virtual machine.

6. The method of claim 1, further comprising providing a custom start-up virtual disk having the set of network configuration directives accessed by the second system.

7. The method of claim 6, wherein the custom start-up virtual disk is within the second controller virtual machine.

8. The method of claim 1, wherein the set of network configuration directives is stored, before the failure event, to a location that is accessible to the second system after the failure event.

9. The method of claim 1, wherein a startup script is stored, before the failure event, to a location that is accessible to the second system after the failure event.

10. A computer readable medium, embodied in a non-transitory computer readable medium, the non-transitory computer readable medium having stored thereon a sequence of instructions which, when stored in memory and executed by a processor causes the processor to perform acts, the acts comprising:
identifying a disaster recovery plan for restarting a set of virtual machines from a first system on a second system, the disaster recovery plan including at least reconfiguration of one or more virtual machines of the set of virtual machines, the first system comprising a first hypervisor and the second system comprising a second hypervisor, the first hypervisor and the second hypervisor being different types of hypervisors, wherein the set of virtual machines from the first system accesses storage devices at the first system through a first controller virtual machine at the first system;
invoking, by the second system, a set of acts to store, at a location accessible to the second system, a set of network configuration directives comprising adapter specific configurations for providing access to a network of the second system through adapters present in the second system, the set of network configuration directives pertaining to the second system;
detecting a failure event at the first system;
accessing, on the second system, the one or more virtual machines of the set of virtual machines from the first system that are to be deployed on the second system in response to detecting the failure event at the first system;
implementing a virtual machine at the second system to provide the set of network configuration directives to the one or more virtual machines, wherein the virtual machine provides access to the one or more virtual machines by:
accessing the set of network configuration directives at the second system in response to detecting the failure event at the first system, and
writing the set of network configuration directives to locations accessible to the one or more virtual machines; and
reconfiguring the one or more virtual machines from the first system to access the network of the second system using adapters present in the second system, wherein the one or more virtual machines from the first system access storage devices at the second system through a second controller virtual machine at the second system.

11. The computer readable medium of claim 10, wherein the virtual machine at the second system is a helper virtual machine, and wherein the locations of the set of network configuration directives written are virtual disks associated with the one or more virtual machines.

12. The computer readable medium of claim 11, wherein reconfiguring the one or more virtual machines includes accessing the virtual disks associated with the one or more virtual machines having the set of network configuration directives written by the helper virtual machine.

13. The computer readable medium of claim 10, wherein the virtual machine at the second system is an ancillary control virtual machine, and wherein the locations of the set of network configuration directives written are cloned virtual disks associated with the one or more virtual machines that are to be deployed on the second system.

14. The computer readable medium of claim 13, wherein reconfiguring the one or more virtual machines includes accessing the cloned virtual disks associated with the one or more virtual machines having the set of network configuration directives written by the ancillary control virtual machine.

15. The computer readable medium of claim 10, the acts further comprising providing a custom start-up virtual disk having the set of network configuration directives accessed by the second system.

16. The computer readable medium of claim 15, wherein the custom start-up virtual disk is within the second controller virtual machine.

17. The computer readable medium of claim 10, wherein the set of network configuration directives are stored, before the failure event, to a location that is accessible to the second system after the failure event.

18. The computer readable medium of claim 10, wherein a startup script is stored, before the failure event, to a location that is accessible to the second system after the failure event.

19. A system comprising:
a storage medium having stored thereon a sequence of instructions; and
a processor or processors that execute the sequence of instructions to cause the processor or processors to perform acts, the acts comprising:
identifying a disaster recovery plan for restarting a set of virtual machines from a first system on a second system, the disaster recovery plan including at least reconfiguration of one or more virtual machines of the set of virtual machines, the first system comprising a first hypervisor and the second system comprising a second hypervisor, the first hypervisor and the second hypervisor being different types of hypervisors, wherein the set of virtual machines from the first system accesses storage devices at the first system through a first controller virtual machine at the first system;
invoking, by the second system, a set of acts to store, at a location accessible to the second system, a set of network configuration directives comprising adapter specific configurations for providing access to a network of the second system through adapters present in the second system, the set of network configuration directives pertaining to the second system;
detecting a failure event at the first system;
accessing, on the second system, the one or more virtual machines of the set of virtual machines from the first system that are to be deployed on the second system in response to detecting the failure event at the first system;
implementing a virtual machine at the second system to provide the set of network configuration directives to the one or more virtual machines, wherein the virtual machine provides access to the one or more virtual machines by:
accessing the set of network configuration directives at the second system in response to detecting the failure event at the first system, and
writing the set of network configuration directives to locations accessible to the one or more virtual machines; and
reconfiguring the one or more virtual machines from the first system to access the network of the second system using adapters present in the second system, wherein the one or more virtual machines from the first system access storage devices at the second system through a second controller virtual machine at the second system.

20. The system of claim 19, wherein the virtual machine at the second system is a helper virtual machine, and wherein the locations of the set of network configuration directives written are virtual disks associated with the one or more virtual machines that are to be deployed on the second system.

* * * * *